July 23, 1940.  D. SCARAMUCCI  2,208,603
APPARATUS FOR CEMENTING WELLS
Filed Aug. 17, 1939
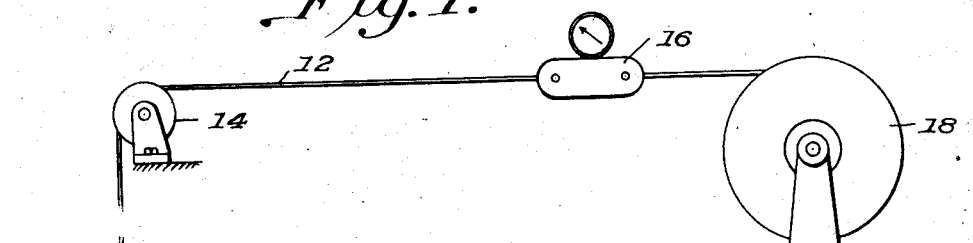
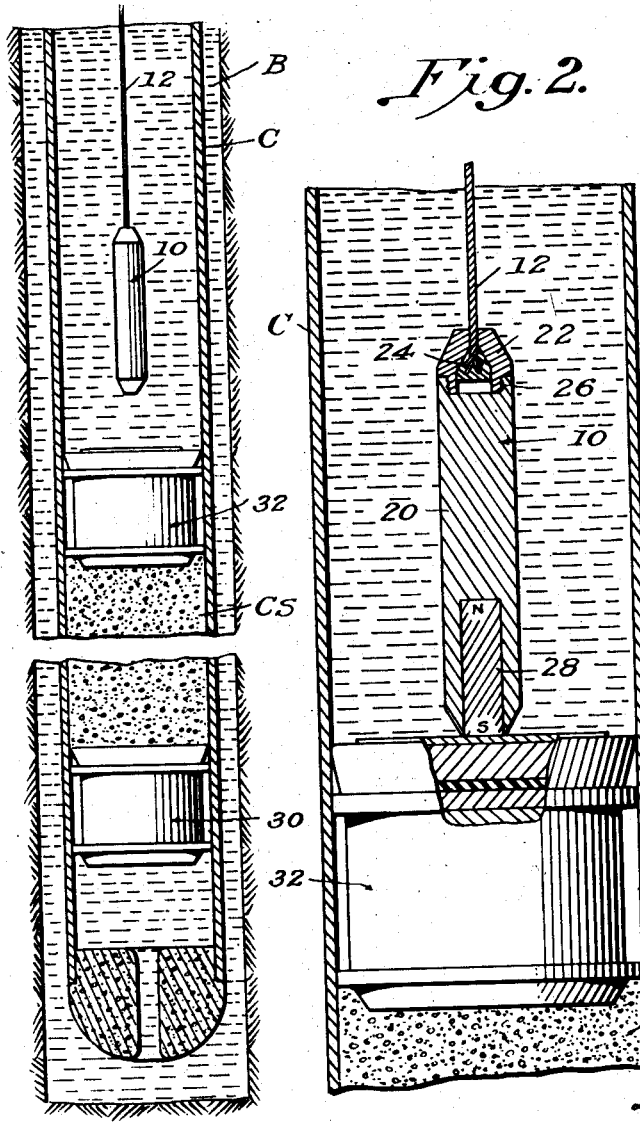
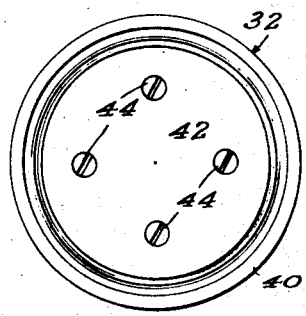
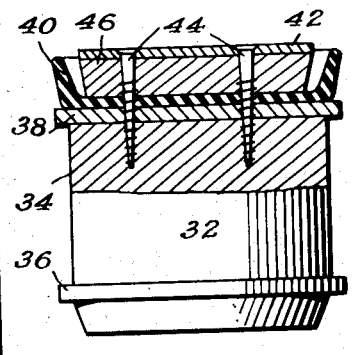
Inventor
Gomer Scaramucci
By Leech & Radue
Attorneys Patented July 23, 1940

2,208,603

UNITED STATES PATENT OFFICE 2,208,603

APPARATUS FOR CEMENTING WELLS

Domer Scaramucci, Oklahoma City, Okla., assignor to Oil Equipment Engineering Corporation, Oklahoma City, Okla., a corporation of Oklahoma Application August 17, 1939, Serial No. 290,712

11 Claims. (Cl. 166—1)

The present invention relates to an improved apparatus for cementing wells, and more particularly to instrumentalities for determining the position of the cement slurry which is used for this purpose.

It has been customary to use a measuring line in the cementing of wells for indicating the position of a plug which is inserted in the well casing above the body of cement slurry to be forced downwardly therein. The measuring line is ordinarily provided with a weight bob or sounding device by means of which the operator is able to locate the plug by the difference in weight, or feel of the measuring line, when the weight is resting on the plug. Suitable instrumentalities for indicating differences in tension on the measuring line are usually employed. This basic method, as outlined, has been found inadequate and unreliable where excessive line friction is encountered. Such a condition is found in crooked wells, wells drilled to great depths, and wells containing viscous fluid. Moreover, the downward movement of the upper cementing plug when the latter is moving rapidly tends to minimize the effect obtainable with an ordinary sounding weight.

Accordingly, this invention has for its purpose to provide a method of sounding for a cementing plug or other object in a well bore by increasing the measuring line effect due to the contact of the weight and such an object. The method contemplates the use of a readily releasable attraction force between the weight and the plug or object.

Specifically stated, it is intended to couple the weight and object magnetically in such a manner that they can be repeatedly joined and released, whereby any uncertainty as to the precise position of a cementing plug or other object is eliminated.

One object of the invention is to improve the cementing operation by the provision of new means for determining accurately the position of the moving cement slurry at all times during placement.

The presently novel method is accomplished by apparatus comprising a sounding weight having magnet means associated therewith for intermittent cooperation with a magnetic material forming a part of a cementing plug or other object which may be inserted into a well.

A correlative object of the invention is the provision of a cementing plug having an associated body of magnetic material arranged to cooperate with the magnet of the sounding weight.

The preceding and other features and advantages of the invention will be better understood and appreciated from a reading of the following detailed description of a specific embodiment in connection with the accompanying drawing, in which—

Fig. 1 is a side elevation, partly in longitudinal section, of an oil well having a casing inserted therein and measuring line apparatus arranged for cooperation with a cementing plug or other object within the casing;

Fig. 2 is a fragmentary longitudinal section to an enlarged scale of the well casing and measuring line apparatus shown in Fig. 1;

Fig. 3 is an upper plan view of a special cementing plug forming a part of the novel apparatus; and Fig. 4 is a side elevation, partially in section, of the plug of Fig. 3.

In Fig. 1, a well bore B is provided with an ordinary casing C of somewhat smaller diameter and a body of cement slurry CS which is to be forced out of the bottom of said casing C for the purpose of cementing the well bore and preventing undesirable infiltration. The measuring line apparatus which is arranged for cooperation with the casing C comprises a sounding weight or device 10 supported by a measuring line 12 which is led over a guide and measuring pulley 14 mounted at the well head. The pulley 14 may be provided with conventional revolution counting means (not shown) for determining the length of line 12 which it has fed into the well. A reel 18 serves to raise and lower the weight 10 as desired. A weight indicating means 16 is associated with the line 12 outside of the well; this indicator 16 responds to differences in tension on the line 12 and enables the operator to determine when the weight 10 is being supported by an object in the well, as well as when the weight and the object are being separated.

Fig. 2 shows certain details of the invention, notably, the construction of the sounding device or weight 10. A generally cylindrical body portion 20 is surmounted by a hollow conical upper end piece 22 having a molded metal anchor plug 24 therein for retaining an end of the measuring line 12. A threaded connection 26 serves to join the body portion 20 and the end piece 22 after the line 12 has been anchored. It should be noted further that the cylindrical body portion 20 of the weight 10 has a magnet core 28 which is exposed at the lowermost end of said weight.

It will be understood that the measuring line 12 is preferably metallic wire which is sufficiently strong and flexible to perform its function. The weight 10 is formed from a non-magnetic and corrosion-resisting material such as brass. A readily molded alloy, such as one of tin and lead in ordinary proportions, is preferred for the anchor plug 24.

Certain desired characteristics of the magnet 28 make a special material highly desirable. For this purpose it has been found preferable to use the magnetic alloy "Alnico" which is made by the Crucible Steel Company. This alloy has much greater magnetic force than ordinary magnetic materials and provides a suitable cast permanent magnet. Because it is relatively weak and brittle, it will drill out readily in the event of loss in the casing bore.

The previously noted cement slurry CS is confined in the well casing C between a lower cementing plug 30 of ordinary form and an upper cementing plug 32 of drillable or frangible materials having the additional attributes now to be described. To form the plug 32, a cylindrical wooden body 34 is provided with spaced lower and upper fabric disks 36 and 38, respectively, which move in sealing engagement with the inside of the well casing C. Immediately above the disk 38 is a skirted rubber washer member 40 which is inverted so that the fluid pressure on its top side will produce a sealing expansion. A circular perforated plate having high permeability, e. g., cast iron, is secured to the upper end of the body 34 by a plurality of screws 44 passing through it and a wooden spacer disk 46 located on top of the resilient washer 40. Although the spacer disk 46 lies within the skirted washer 40, it is of such a height as to support the cast iron plate 42 above all other portions of plug 32 so that it may be readily engaged by the magnet means 28 of the sounding device 10. Specific materials have been ascribed to the elements forming the upper cementing plug 32, but other suitable materials having equivalent properties may, of course, be substituted.

In operation, the lower cementing plug 30, the cement slurry CS, and the upper cementing plug 32 will have been placed within the well casing C and the sounding device 10 will have been lowered into said casing C on the measuring line 12. As the cement slurry CS is forced downwardly by means of hydraulic pressure applied to the upper end of plug 32, it may be followed by the sounding device 10 which is joined magnetically thereto. Whenever the operator desires to know the position of the cement slurry CS, he will separate the magnetic weight device 10 from the plug 32 which carries the plate 42 of magnetic material. Separation may be accomplished by retarding or braking reel 18. The strength of the magnet means 28 with respect to the downward pull of the plug 32 will be such that a definite change in line tension will be shown on the indicating means 16 when the magnetic union between weight 10 and plug 32 is broken. A repetition of this procedure will serve to check any reading. In this manner, the sounding device can be caused to follow the cement closely and to move into and out of releasable engagement with the upper plug 32. As the desired position of the cement is approached, the operator can take the proper steps to stop pumping and thus control the hydraulic pressure producing downward movement of the cement.

The foregoing descriptions of the preferred procedure and forms of apparatus are intended to be illustrative, since it will be apparent to those skilled in this art that variations and modifications can be made which will come within the scope and spirit of the appended claims.

What I claim as new and desire to secure by Letters Patent of the United States is:

1. Measuring apparatus for determining the position of an object in a well or the like, which comprises, a sounding line, a weight attached to the line, an object adapted to be positioned within the well and to be engaged by the weight, and cooperating magnetic means forming parts of the weight and object respectively for joining them detachably upon engagement.

2. Apparatus for use in cementing a well comprising a measuring line, a sounding weight secured to the measuring line, and a cementing plug adapted for cooperation with the sounding weight, said weight and plug being provided with means for holding them together magnetically when the weight contacts the plug.

3. Apparatus for use in cementing a well comprising a measuring line, an elongated sounding weight fastened to an end of the line, and a cementing plug adapted to be detachably engaged by said weight, said weight and plug being provided with cooperating means including a permanent magnet arranged for joining them magnetically.

4. Apparatus for use in cementing a well comprising a measuring line, an elongated sounding weight secured to the measuring line and having magnet means associated with its lower end, and a cementing plug having a magnetic portion arranged to engage the magnet means of the weight.

5. Apparatus for use in cementing a well comprising a measuring line, an elongated sounding weight secured to the measuring line and having permanent magnet means associated with its lower end, and a cementing plug having a plate of magnetic material on its upper end arranged to engage the magnet means of the weight.

6. Apparatus for use in cementing a well comprising a measuring line; a cylindrical sounding weight of non-magnetic material secured to the measuring line and including magnet means mounted as a core in its lower end, one end of the magnet means being exposed at the lower end of the weight; and a cementing plug having a magnetic portion arranged to engage the magnet means of the weight.

7. A cementing plug comprising a body portion of frangible material and an exposed portion of magnetic material secured to its upper end.

8. An upper cementing plug comprising a body portion of frangible material and an exposed portion of magnetic material secured to its upper end, said portion having a face which is above all other portions of the plug.

9. A cementing plug comprising a frangible body portion, a resilient skirted washer on the upper end of said body portion, a plate of magnetic material secured to the upper end of the body portion above the resilient washer, and a frangible spacer member between said washer and said plate.

10. In apparatus for use in oil wells or the like, the combination comprising a measuring line; an elongated weight member secured to said line, said weight member having magnet means associated with its lower end; and a body adapted to move in a well below the weight member, said body having a portion of magnetic material arranged to engage the magnet means of the weight, whereby the magnetic force of attraction will be manifested in the measuring line as the weight member and body are magnetically engaged and disengaged.

11. In apparatus for use in oil wells, the combination comprising a measuring line; an elongated weight member secured to said line, said weight member having permanent magnet means secured to its lower end with a portion thereof exposed; and a cementing plug adapted to move in a well below the weight member, said plug having a portion of magnetic material arranged on its upper end to engage the magnet means of the weight, whereby the magnetic force of attraction will be manifested in the measuring line as the weight member and body are magnetically engaged and disengaged.

DOMER SCARAMUCCI.